United States Patent [19]
Karpinsky

[11] Patent Number: 5,924,550
[45] Date of Patent: Jul. 20, 1999

[54] ELASTIC WEB CONVEYOR CORNER TURN

[76] Inventor: James L. Karpinsky, W7698 Phillips Rd., Poynette, Wis. 53955

[21] Appl. No.: 08/865,928

[22] Filed: May 30, 1997

Related U.S. Application Data

[63] Continuation-in-part of application No. 08/516,381, Aug. 17, 1995, Pat. No. 5,673,784.

[51] Int. Cl.$^6$ .................................................. B65G 15/02
[52] U.S. Cl. ........................................ 198/831; 198/844.1
[58] Field of Search .................................... 198/831, 837, 198/844.1, 849, 840, 848

[56] References Cited

U.S. PATENT DOCUMENTS

| | | | |
|---|---|---|---|
| 23,878 | 5/1859 | Wood . | |
| 774,560 | 11/1904 | Carlson . | |
| 1,206,305 | 11/1916 | Cowley . | |
| 1,476,936 | 12/1923 | Walden . | |
| 2,234,537 | 3/1941 | Blackburn | 198/182 |
| 2,260,587 | 10/1941 | Shields | 198/109 |
| 2,278,361 | 3/1942 | Rapisarda | 198/182 |
| 2,686,589 | 8/1954 | Temple | 198/831 |
| 2,713,412 | 7/1955 | Douglass | 198/182 |
| 2,862,602 | 12/1958 | Greer et al. | 198/182 |
| 2,880,847 | 4/1959 | Kelley | 198/109 |
| 2,957,572 | 10/1960 | Dvorak | 198/203 |
| 3,252,200 | 5/1966 | Gulde et al. | 25/142 |
| 3,289,818 | 12/1966 | Kittredge | 198/190 |
| 3,635,328 | 1/1972 | Burkholder | 198/161 |
| 3,840,111 | 10/1974 | Randrup | 198/190 |
| 3,854,575 | 12/1974 | Fraioli, Sr. | 198/182 |
| 3,912,072 | 10/1975 | Kornylak | 198/183 |
| 3,991,876 | 11/1976 | Schmidt, Sr. et al. | 198/831 |
| 3,997,048 | 12/1976 | Hardy | 198/577 |
| 4,013,165 | 3/1977 | Bush | 198/817 |
| 4,024,949 | 5/1977 | Kleysteuber et al. | 198/831 |
| 4,227,610 | 10/1980 | Gerdes et al. | 198/831 |
| 4,230,223 | 10/1980 | Flajnik | 198/817 |
| 4,260,053 | 4/1981 | Onodera | 198/812 |
| 4,556,143 | 12/1985 | Johnson | 198/841 |
| 4,662,509 | 5/1987 | Kaak | 198/792 |
| 5,038,925 | 8/1991 | Chrylser | 198/831 |
| 5,052,548 | 10/1991 | Andrews | 198/817 |
| 5,067,608 | 11/1991 | McLellan | 198/817 |
| 5,168,978 | 12/1992 | Cox et al. | 198/369 |
| 5,259,495 | 11/1993 | Douglas | 198/404 |
| 5,332,082 | 7/1994 | Sommerfield | 198/831 |
| 5,394,977 | 3/1995 | Cline | 198/831 |
| 5,415,273 | 5/1995 | Peterson | 198/831 |
| 5,667,058 | 9/1997 | Bonnet | 198/831 |
| 5,673,784 | 10/1997 | Karpinsky et al. | 198/831 |

FOREIGN PATENT DOCUMENTS

| | | |
|---|---|---|
| 2048289 | 2/1992 | Canada . |
| 0469570 | 2/1992 | European Pat. Off. . |
| 2203902 | 8/1972 | Germany . |
| 1058837 | 12/1983 | U.S.S.R. . |
| 287294 | 4/1928 | United Kingdom . |
| 339465 | 1/1931 | United Kingdom . |
| 2220903 | 5/1988 | United Kingdom . |

Primary Examiner—William E. Terrell
Assistant Examiner—Khoi H. Tran
Attorney, Agent, or Firm—Lathrop & Clark LLP

[57] ABSTRACT

An elastic web belting is formed into a continuous loop for insertion on a conveyor frame which is formed with a cantilevered construction so the preformed complete loops can be installed on the frame without welding or cutting. The composite belt has an inner belt which is connected to an outer L-shaped belt by an array of angled spoke belts. The L-shaped outer belt engages with two outer pulleys such that the spokes extend over the tops of the pulleys. As the composite belt makes the turn in the conveyor, the spoke belts are elastically stretched, thereby conveying the carried product through the corner.

39 Claims, 10 Drawing Sheets

ELASTIC WEB CONVEYOR CORNER TURN

RELATED APPLICATION

This application is a continuation-in-part of application No. 08/516,381, filed Aug. 17, 1995, now U.S. Pat. No. 5,673,784.

FIELD OF THE INVENTION

The present invention relates to conveyors in general, and to conveyors which move articles around a corner in particular.

BACKGROUND OF THE INVENTION

Modern production lines, in which multiple operations are performed at separated stations to produce a finished article, require conveyors to advance the work piece or product from one station to another. Conveyors carry the product as it is produced or assembled, and then carry the product for packaging and eventual discharge to storage or a shipping point. To most effectively make use of production floor space, it is often desirable to cause the product to turn a corner or to reverse its direction of travel. The conveyor corner turn enables the product to negotiate a change in direction up to a full 180 degree turn or to spiral upward to change heights.

Without being very costly or unsanitary, the conventional wide belts on a belt conveyor are not able to make a turn without undesirable wrinkling or displacement of the belt. Plastic or metal link conveyor belts are collapsible at the inner radius to allow a curved path, but such belting material is costly and, because of the multiple cavities defined between the links, difficult to clean.

Ease of maintenance and cleaning is important in conveyors, and is particularly so in food product applications. Health and safety regulations set standards for cleanliness which must be maintained when food products are being manufactured, packaged and transported.

Conveyors are known which employ plural, generally parallel arrangements of rubber belts which are supported on metal tables, and which make a turn by angling around rotatable pulleys mounted to the table. Such older design conveyors are generally not cleanable by current USDA standards. In addition, conveyors employing rubber belts required that the mechanism allow a belt to be installed as a preformed loop, necessitating many release catches and fasteners which are potential sites for dirt accumulation. Conveyors employing flexible urethane belting of circular cross-section have also been used. Urethane belting is particularly suited to hygienic uses because it has a smooth moisture-resistant surface which may be easily cleaned. Although flexible urethane belting may be mounted on the conveyor by welding of cut belt ends, the welding operation does require set-up and cooling time, and a certain amount of skill is required from the belt installer. Another known conveyor loops the flexible urethane belts around pulleys which are arrayed on radial arms which cut across the conveyance path and returns the belts on an underlying array of return pulleys. Such systems, however, require welding of the belts to install them on the machine, and utilize the resilience of the urethane belting to properly achieve tension on the belts. Resilient urethane belts are stretchable, and hence will deflect downwardly as the conveyed article is supported. If the conveyed article is of too great a weight, proper belt travel may be impeded.

Typically smaller articles have had to be conveyed around corners on multiple contacting rollers, specialized expanding link belts or other complex and costly conveyor systems. Complicated linked belt systems will often present greater difficulties in cleaning due to the number of linked parts.

What is needed is a hygienic conveyor corner turn which can support moderate to heavy products as well as smaller discrete articles and which minimizes down time by rapid changeover of new belts.

SUMMARY OF THE INVENTION

The conveyor corner turn of this invention utilizes an elastic web belting having an outer belt spaced from an inner belt which is connected by an array of elastic spoke-like belt segments. The inner and outer belts are formed into continuous loops, such that the strands of the web extend as portions of the web proceed through the corner. The conveyor frame is formed with a cantilevered construction to allow preformed complete loops to be installed on the frame without welding or cutting. The L-shaped outer belt engages with two outer pulleys such that the spokes extend over the tops of the pulleys. As the composite belt makes the turn in the conveyor, the spoke belts are elastically stretched, thereby conveying the carried product through the corner.

It is an object of the present invention to provide a conveyor corner turn which may be easily cleaned.

It is also an object of the present invention to provide a conveyor corner turn which supports loads on multiple combined belts with minimal downward deflection of the belts.

It is another object of the present invention to provide a conveyor corner turn in which the belts may be rapidly replaced.

It is an additional object of the present invention to provide a plural belt conveyor corner turn which is easily installed.

It is a further object of the present invention to provide a composite belt for a corner turn conveyor which is of unitary construction.

Further objects, features and advantages of the invention will be apparent from the following detailed description when taken in conjunction with the accompanying drawings.

DESCRIPTION OF THE PREFERRED EMBODIMENTS

Figure 1:
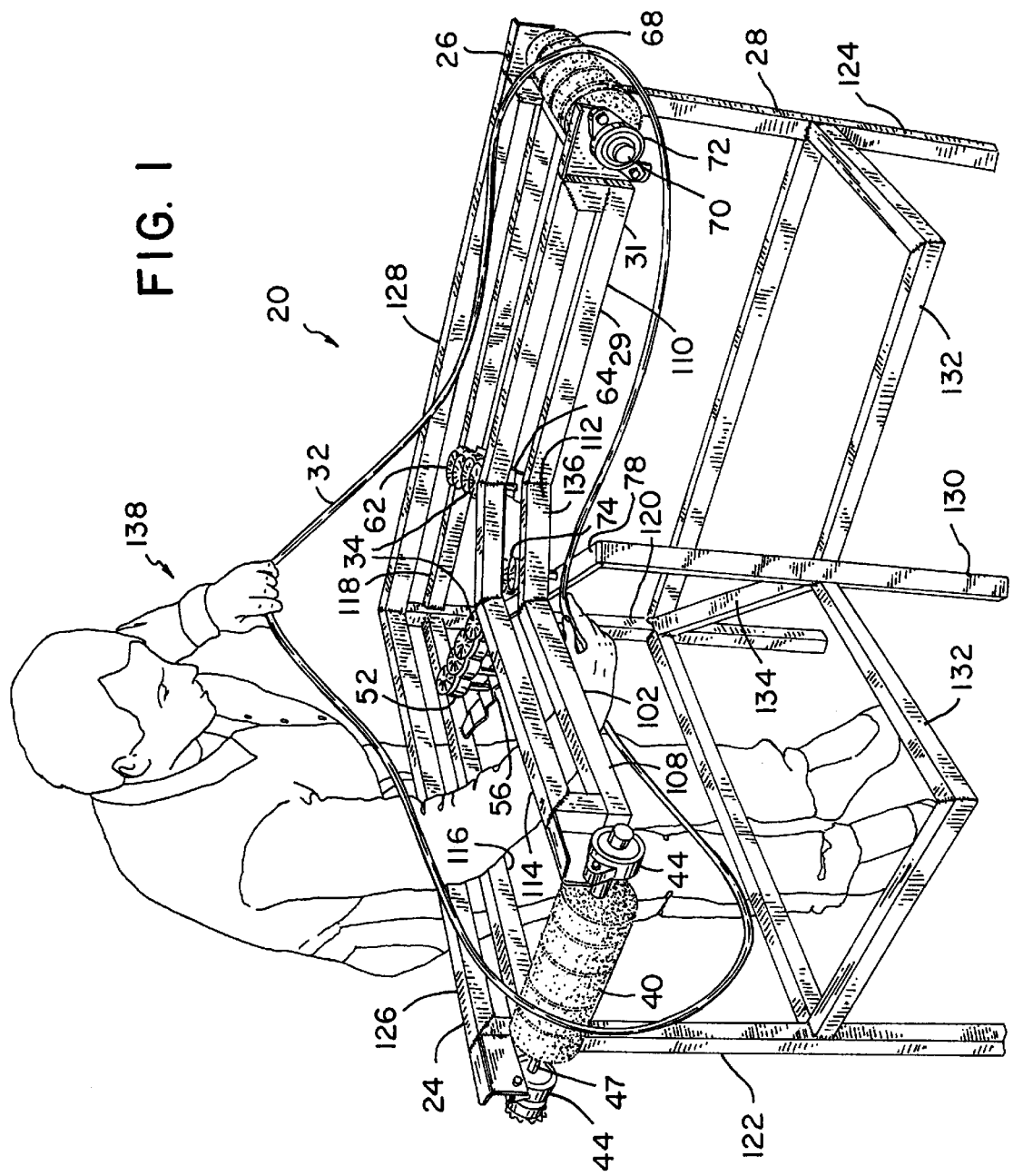
FIG. 1 is a perspective view of the conveyor corner turn of the present invention, with the installation of a belt underway.

Referring more particularly to FIGS. 1–10, wherein like numbers refer to similar parts, the conveyor corner turn 20 of this invention is shown in FIG. 1. The corner turn 20 will typically be positioned as part of a more extensive conveyor system (not shown) including straight conveyor segments which advance articles 22 to the infeed 24 of the corner turn 20 and receive articles from the outfeed 26 of the corner turn. The corner turn 20 has an open frame 28. The frame 28 includes an upper frame 29 which is part of an upper conveyor assembly 31 which is cantilevered out over support legs at a desired elevation. The cantilevered upper frame allows preformed belts 32 to be positioned on the conveyor. For food product handling the frame and legs are preferably formed of welded stainless steel. Articles 22 are conveyed around the corner turn 20 on the belts 32 which are turned by arrays of corner pulleys 34 positioned at 22.5 degrees to the infeed 24 and at 67.5 degrees to the infeed. It should be noted that other orientations and numbers of belts will also perform acceptably.

The belts 32 are preferably urethane round belting, such as that manufactured by Eagle Belting Company of Des Plaines, Ill. Urethane belting is resistant to water penetration and is easily cleaned. To resist deflection of the resilient urethane belts, the belts are preferably reinforced with a metal or fiber reinforcement which extends lengthwise within the urethane. Although pure urethane belts may be welded in place, the equipment required for fully welding a length of reinforced belting is generally fixed and too cumbersome to be used in the field. The corner turn 20, however, allows the belts to be preformed and fabricated to the size required for each corner pulley position on the turn.

In the illustrated embodiment, four continuous looped belts 32 are employed in the corner turn 20 to define a conveyor path 36. It should be noted that a corner turn with two or more paths may also be formed. Each looped belt 32 follows a similar path as it travels through the corner turn 20. At the infeed 24 a belt 32 passes over a plastic idler roller 40. For reduced friction, the idler rollers 40 are mounted on an axle 47 which turns in two bearings 44 mounted to the upper frame 29.

Figure 2:
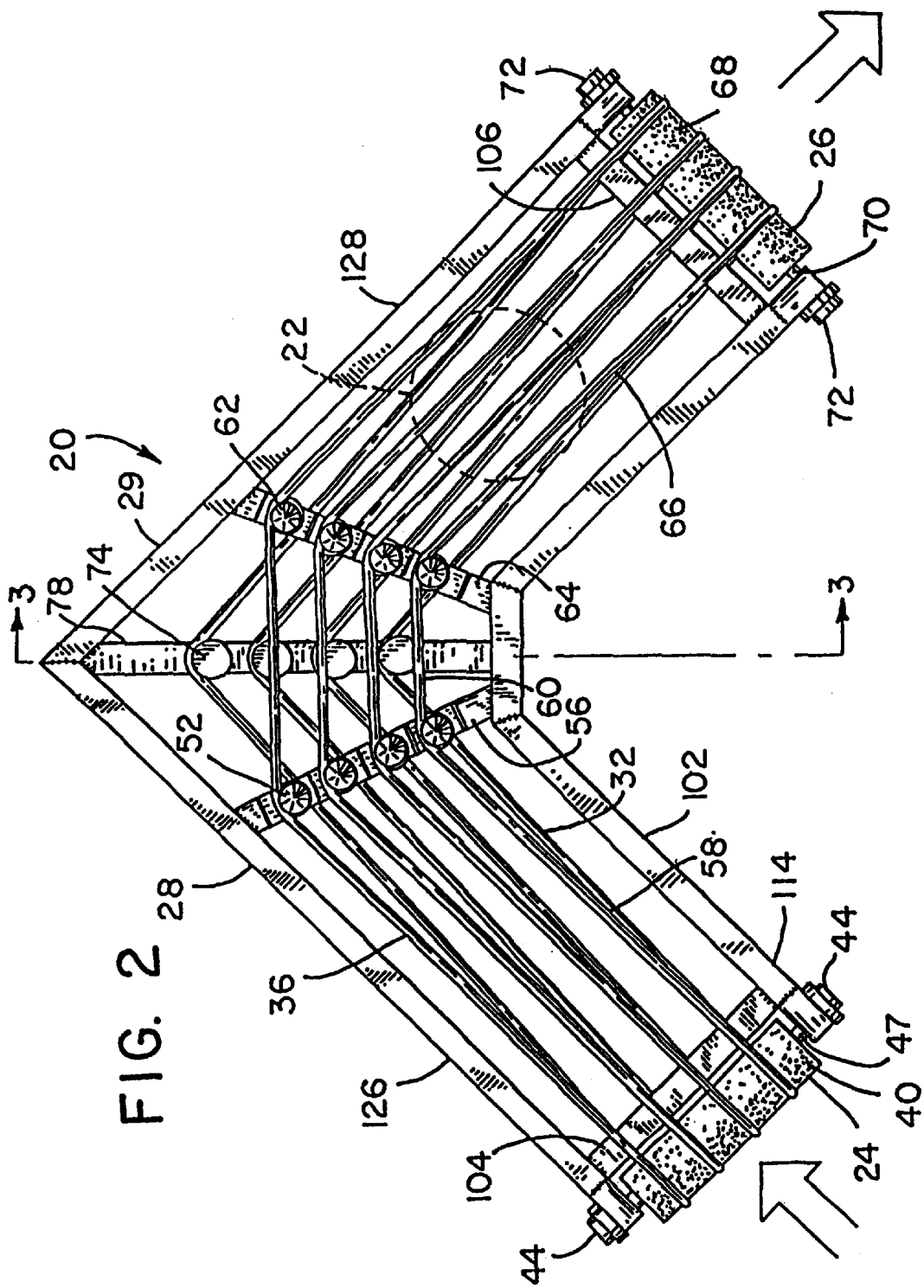
FIG. 2 is a top plan view of the conveyor corner turn of FIG. 1.
Figure 3:
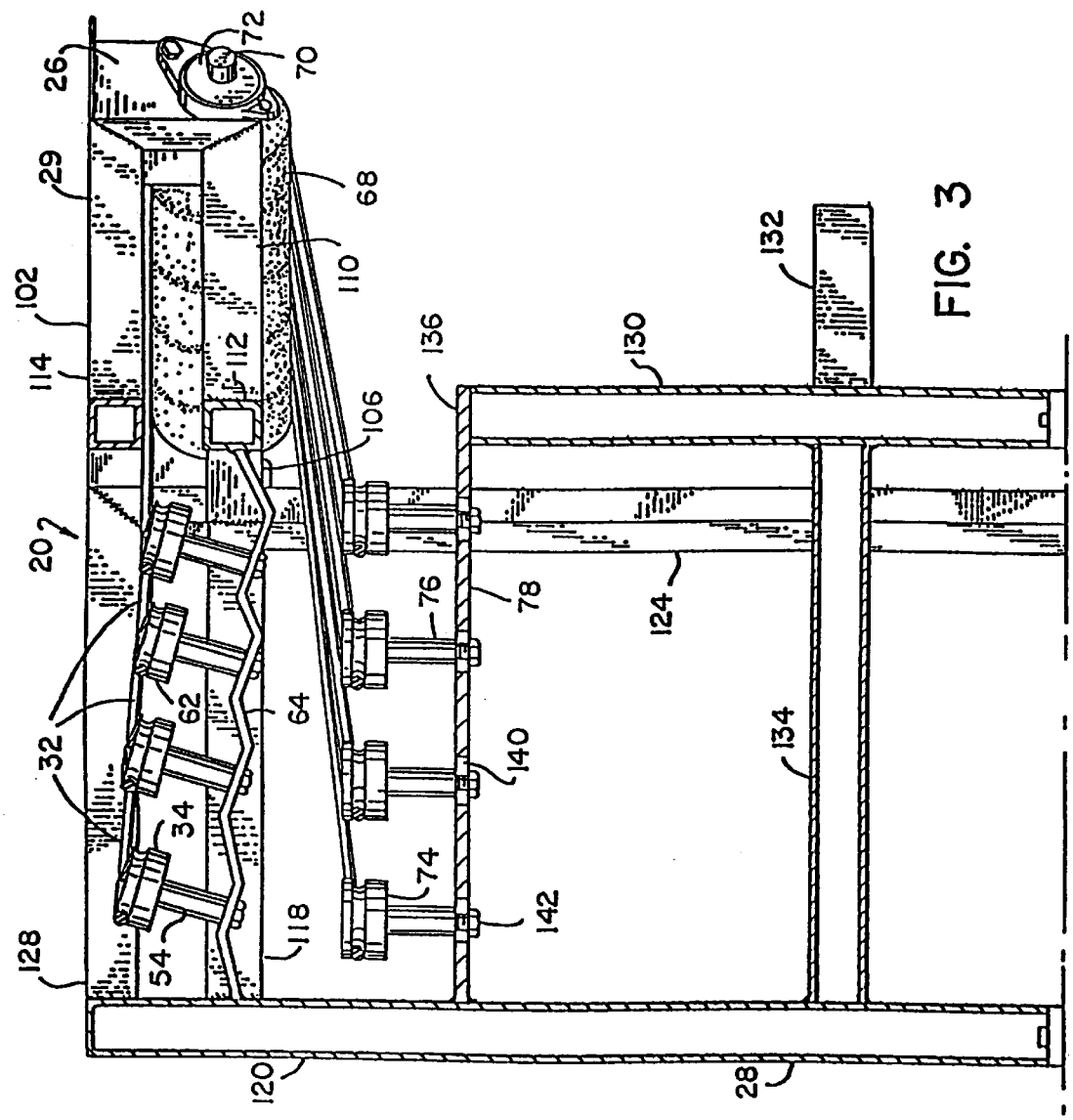
FIG. 3 is a cross-sectional view of the conveyor corner turn of FIG. 2, taken along section line 3—3.

The upper frame 29 has a cantilevered portion 102, as shown in FIGS. 2 and 3. The cantilevered section is supported by an infeed crosspiece 104 which extends parallel to the infeed roller 40, and an outfeed crosspiece 106 which extends parallel to the outfeed roller 68. A generally L-shaped structure extends between the infeed crosspiece 104 and the outfeed crosspiece 106, and has two perpendicular inner members 108, 110 joined to a central attachment member 112. An L-shaped stiffening member 114 is positioned above the inner members 108, 110, and the attachment member 112. The upper frame also has two outer members 116, 118, which extend between an outer central leg 120 and an infeed leg 122 and an outfeed leg 124 respectively. Outer stiffening members 126, 128 also extend between the legs above the outer members 116, 118. The frame supports the infeed roller, the outfeed roller, and the corner pulleys at points exterior to the curved path. The legs 120, 122, 124, extend downwardly from the frame exterior to the path and engage a support surface such as a concrete floor. To prevent interference with mounting of the belts, no vertical structure extends continuously downward from the interior of the path to the support surface As best shown in FIG. 1, an inner central leg 130 is positioned below the inner attachment member 112 interior to the path, but is not connected to the upper frame 29. The inner central leg is connected to the infeed leg 122 and the outfeed leg 124 by two L-shaped members 132. The inner central leg is also connected to the outer central leg by the return pulley support bar 78, and by an angled tubular member 134. The overhanging portions of the upper frame 29 thus define a pass-through 136 above the return pulley support bar 78.

Where space permits, the conveyor assembly is preferably cantilevered from the outside of the curved path, if required by the layout needs of a particular conveyor, the conveyor assembly of the infeed roller, the outfeed roller and the corner pulleys may be supported from the interior of the curve.

Figure 5:
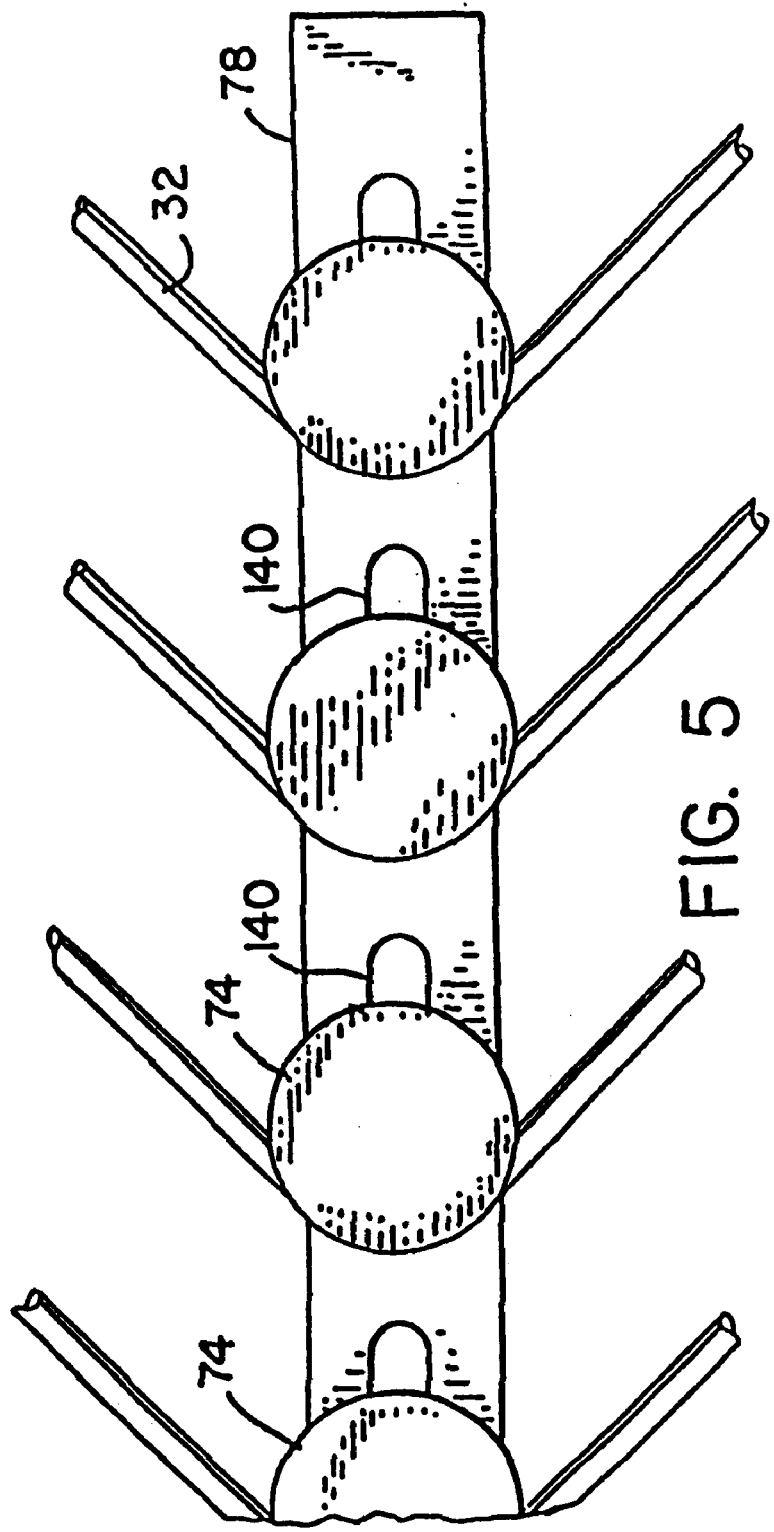
FIG. 5 is a fragmentary top plan view of the adjustable return pulleys of the conveyor of FIG. 2.

As shown in FIG. 1, a belt installer 138 initially prepares the conveyor for operation by installing four preformed belts. Because each corner pulley is mounted to the cantilevered portions of the frame radially outwardly from another corner pulley, the lengths of the belts which extend around the corner pulleys will be greater the further out the corner pulley is positioned on the curved conveyor path. Each belt is formed by the manufacturer to the length to suit the corner pulleys at a certain radial position. Holding the upper run of the belt in one hand, the installer 138 brings the lower run of the belt through the pass-through 136 and underneath the upper frame 29. The upper run of the belt is positioned on two corner pulleys, and the lower run is positioned on one return pulley. As shown in FIG. 5, the return pulleys are mounted in radial slots 140 which allow them to be positioned to apply the desired level of tension. The return pulley shafts are fixed in place by adjustment of bolts 142. Thus the cantilevered portions of the frame provide a means for supporting the infeed roller, the outfeed roller, and the corner pulleys such that the continuous belts may be positioned on and removed from said rollers and pulleys without breaking the continuity of the belts. No cutting or welding of the belts is required, and hence minimal down time is observed for maintenance on the belts.

An infeed segment 58 of each belt 32 is defined between the infeed idler roller 40 and a first corner pulley 52 which is mounted on a shaft 54 which extends from a first pulley mounting bar 56 which extends at an angle of approximately 22.5 degrees from the direction of the infeed segments 58 of the belts 32. The first pulley mounting bar 56 extends between the attachment member 112 and the outer member 116. Each belt 32 extends in a turn segment 60 from a first corner pulley 52 to a second corner pulley 62 which is mounted on a shaft 54 which extends from a second pulley mounting bar 64. The second pulley mounting bar 64 extends between the attachment member 112 and the outer member 118, and extends at approximately a 45 degree angle from the first pulley mounting bar 56.

Each belt extends in an outfeed segment 66 from a second corner pulley 62 to an outfeed roller 68 mounted on an axle 70 which is supported on bearings 72 which are fixed to the upper frame 29. The belts 32 are turned around the outfeed rollers 68 and loop back to the infeed roller 40 by way of the return pulleys 74 which are mounted on shafts 76 which extend upwardly from the return pulley mounting bar 78. The return pulley mounting bar is positioned intermediate between the first corner pulley mounting bar 56 and the second corner pulley mounting bar 64.

Figure 4:
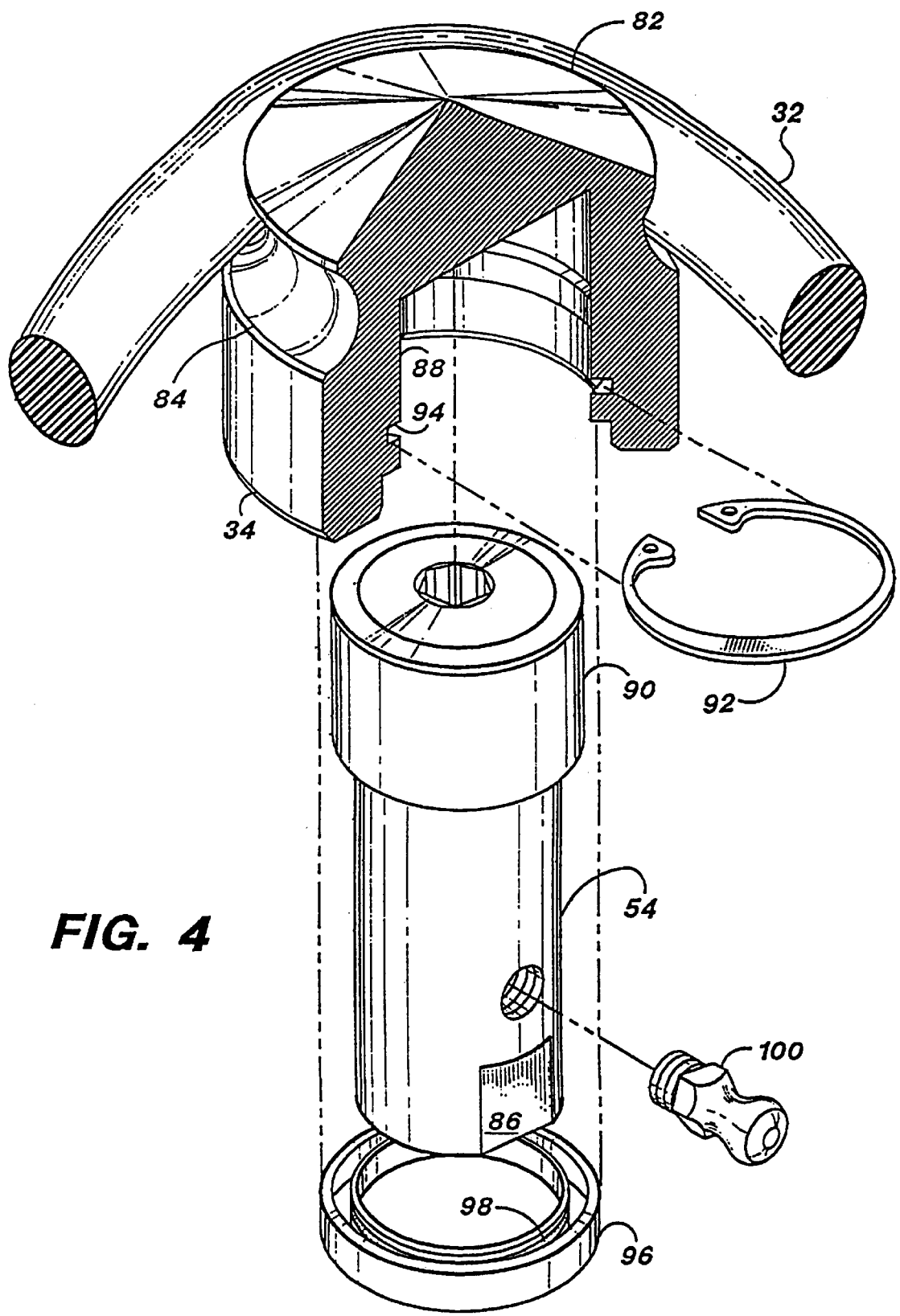
FIG. 4 is an exploded isometric view, partly broken away, of a pulley assembly of the conveyor corner turn of FIG. 1.

As shown in FIG. 3, the corner pulleys 34 are mounted to rotate about an axis which is inclined from the vertical. Each corner pulley 34, as shown in FIG. 4 is preferably formed from plastic, or may be formed of stainless steel, and has a conical top 82 above a groove 84 which encircles the pulley 34 and receives the belt 32. The inclination of the pulley shafts 54 positions the conical tops 82 of the pulleys 34 so that the portion of the top which is moving with the direction of article flow on the conveyor extends above the belt 32 and engages with an article making the turn. The portion of the pulley top 82 which is moving counter to the direction of article flow is beneath the level of the belts 32 and hence does not retard article flow. In addition, the corner pulleys 34 shield the belts 32 from engagement with the conveyed articles as the belts pass around the pulleys, which contributes to the secure engagement of the belts with the pulleys. Each of the corner pulley mounting bars 56, 64 is formed of a bent steel plate having a series of inclined segments corresponding to the position of each corner pulley shaft 54. Any alternative support structure which positions the pulleys as desired would be acceptable.

In a preferred embodiment, the corner pulley mounting bars 56, 64, are fixed to the upper frame 29 such that the outer pulleys are elevated above the inner pulleys. By thus positioning the pulleys, the conveyor path is banked to the outside of the corner turn. This banking counteracts the tendency of articles to be flung radially outwardly in making the turn, especially at higher belt speeds.

The cylindrical shafts 54, as shown in FIG. 4 have opposed parallel surfaces 86 which engage within non-circular holes in the mounting bars 56, 64 to hold the shafts 54 rigidly and non-rotatively to the mounting bars 56, 64. As shown in FIG. 4, each pulley has a downwardly opening cavity 88 into which a thrust bearing 90 is press fit. The thrust bearing may be any conventional bearing such as the Cam-follower needle type CF one and one eighth SB bearing manufactured by McGill Bearing. The bearing 90 is threadedly engaged with the shaft 54. The corner pulley is retained on the bearing 90 by a snap ring 92 which is engaged within an annular slot 94 formed in the pulley cavity 88 beneath the level of the bearing 90. The bearings 90 provide for consistent and long term rotation of the pulleys while subject to the varying loads of the conveyed articles 22. Grease fittings 100 allow the bearings to be lubricated as needed.

Particularly in food industry applications, a resilient gasket 96, shown in FIG. 4, is engaged within the cavity 88 beneath the bearing 90. The gasket 96 has an inner diameter spring 98 which retains a seal about the shaft and prevents contaminants from reaching the more difficult to clean interior of the cavity 88.

Although a single set of corner pulleys may be employed to turn the belts, it is desirable to provide at least two sets for a right angle corner turn to reduce the angle which the conveyed product must turn at each pulley. By breaking the full 90 degree turn into two lesser turns, the belts are wrapped in an obtuse angle about the pulleys, facilitating smooth operation of the conveyor.

The return pulleys 74 rotate about a substantially vertical axis, as no articles are conveyed over the return pulleys. Multiple sets of return pulleys are likewise not required, as there is no need to reduce the harshness of the turn for the belts themselves.

It should be noted that although a 90 degree corner turn has been illustrated above, corner turns of 45 degrees may be formed by using only a single set of corner turn pulleys on a single mounting bar. Furthermore, corner turns of greater than 90 degrees may be formed by adding additional sets of corner turn pulleys on additional mounting bars. Such conveyor corner turns may be employed where, for example, it is required to turn a conveyor back on itself to reverse direction in a serpentine product flow. Furthermore, although the corner turn 20 may be employed as the corner of a flexible belt conveyor, it may also be used as the corner of other conveyor types, for example fabric belt or link conveyors.

Although the drive for the corner turn 20 has not been shown, either of the infeed or outfeed rollers may be connected to a drive motor, or may be in turn driven by a set of urethane belts which extend from an infeeding straight section of conveyor.

Figure 6:
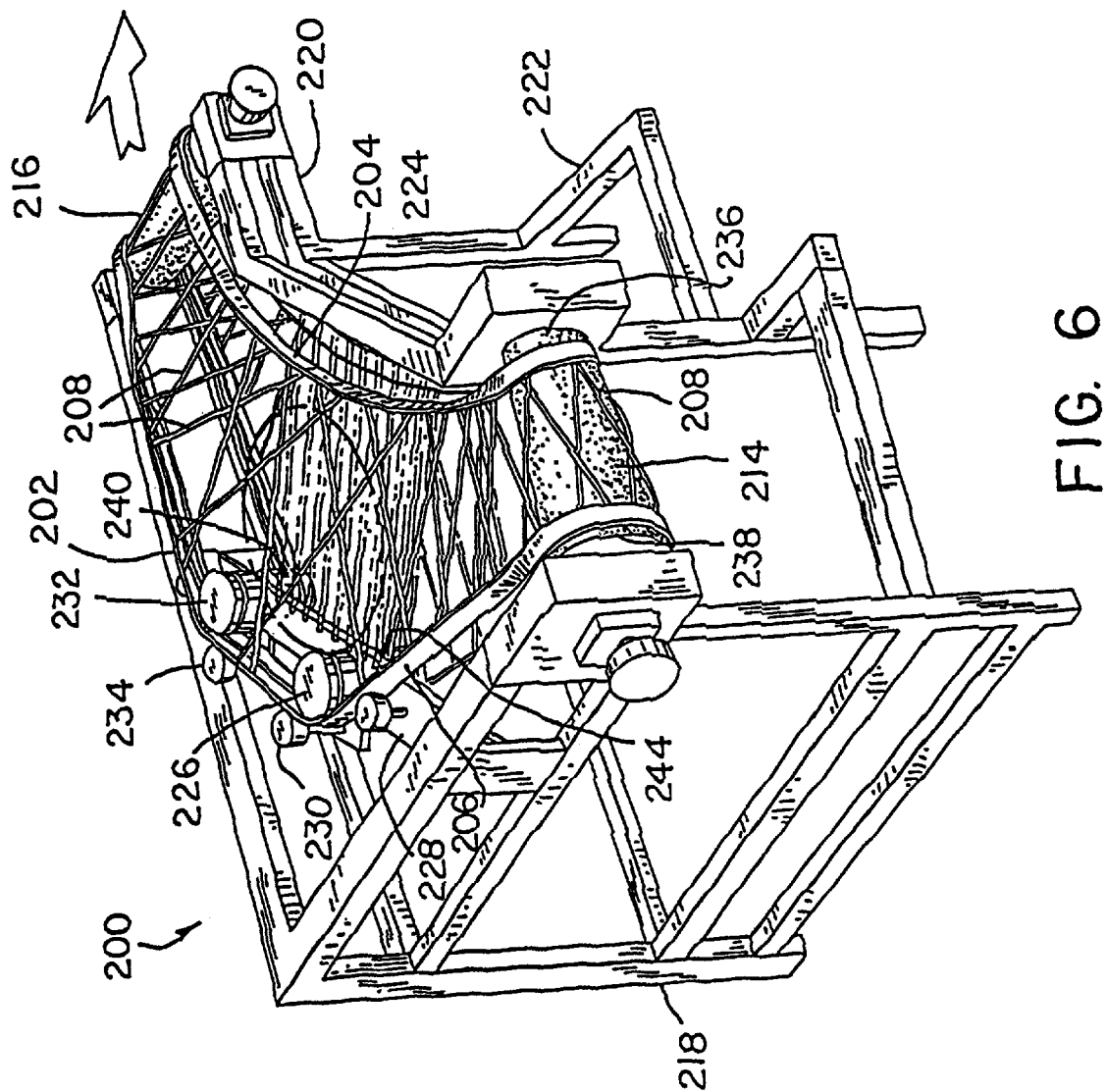
FIG. 6 is an isometric view of a conveyor corner turn of this invention employing a web belt assembly.
Figure 7:
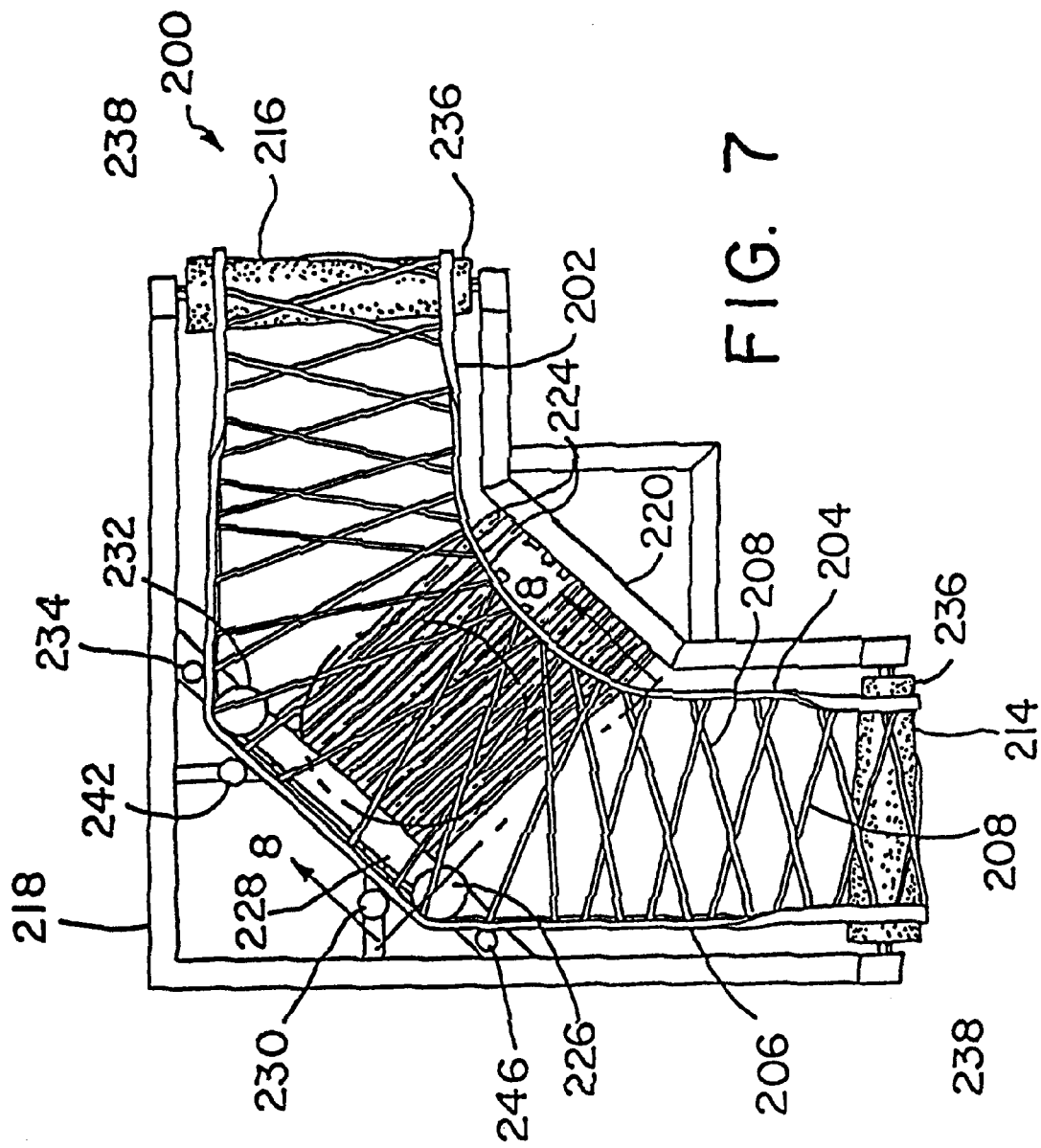
FIG. 7 is a top plan view of the conveyor corner turn of FIG. 6.
Figure 8:
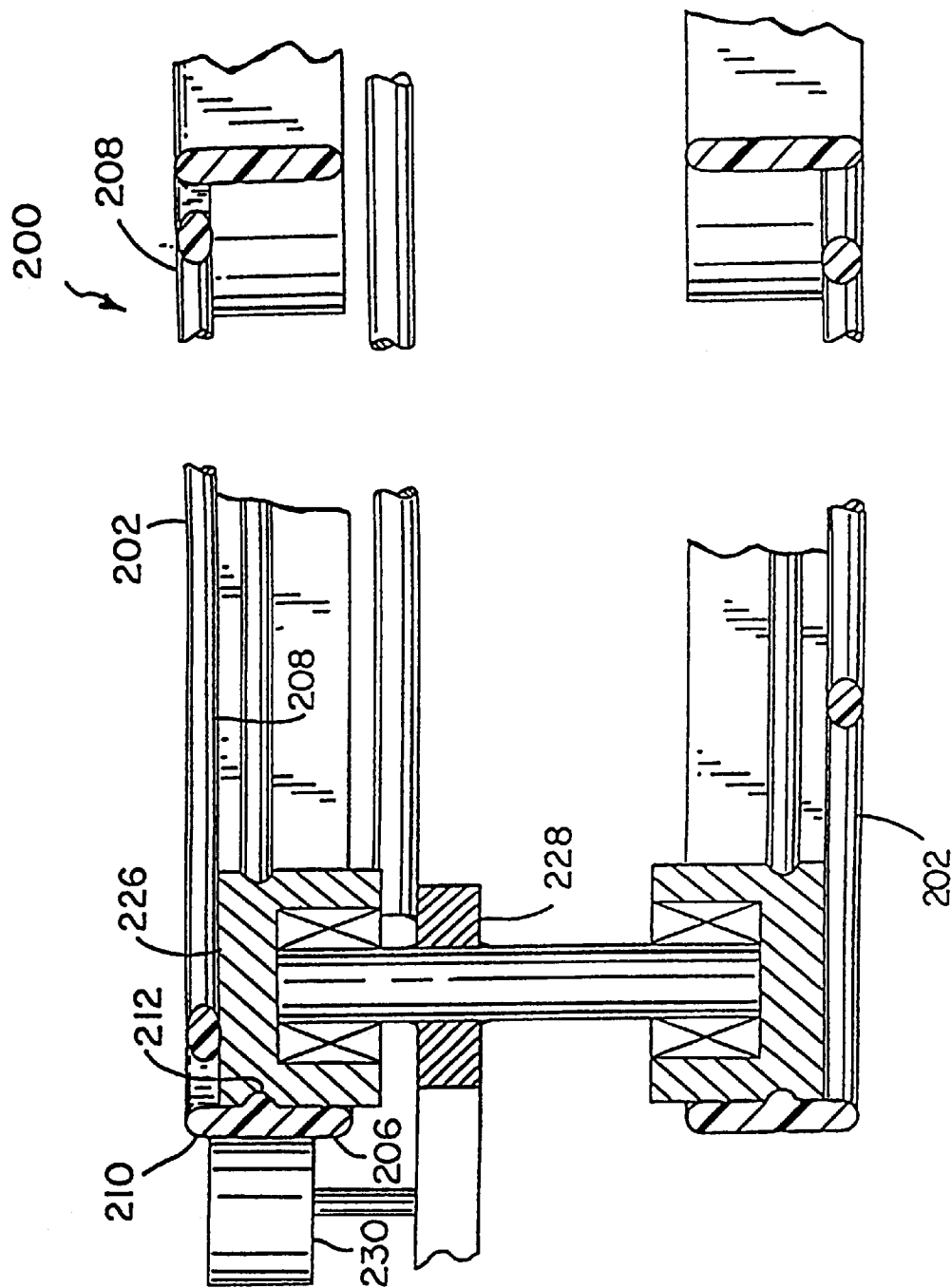
FIG. 8 is an enlarged fragmentary cross-sectional view of the conveyor corner turn of FIG. 7, taken along section line 8—8.

An alternative embodiment conveyor corner turn 200 which will support smaller articles is shown in FIGS. 6–8. The corner turn 200 employs a single looped web belt 202 composed of prewelded individual belt elements which are formed into a spoked web which is thus capable of supporting smaller products. The single composite belt 202 has an inner belt 204 and an outer belt 206. As shown in FIG. 8, the outer belt 206 has a generally L-shaped cross section with an upwardly extending leg 210 and an inwardly extending leg 212. The inner belt 204 is rectangular in cross-section. The inner belt 204 and outer belt 206 may be non-elastic, and preferably fiber reinforced. An array of narrow diameter polyurethane elastic spoke belts 208 stretch between the L-shaped outer belt 206 and inner belt 204.

As shown in FIG. 7, the spoke belts 208 are closely spaced and overlapping and extend inwardly at an angle from the outer L-shaped belt and thus may accommodate changes between the positions of the inner belt and the outer belt as the composite belt 202 travels through the corner. The spacing and number of spoke belts 208 employed will depend on the size of the product to be conveyed, with a greater number of spoke belts required for smaller products, to provide a maximum opening between spoke belts which is smaller than the product size. The spoke belts 208 are connected to the upper part of the inner belt, and to the upwardly extending leg 210 of the outer belt 206.

It is necessary for the inner belt 204 to move at a speed which is less than that of the outer belt 206, due to the fact that the inner belt has reduced travel distance on the internal diameter of the conveyor than the outer belt. In an exemplary conveyor 200 the inner belt 204 is spaced one foot from the outer belt 206 and the radius of curvature of the outer belt is three feet. The best way to accommodate this is by using conical rollers 214, 216. The outer diameter of the conical rollers in an exemplary conveyor is about 4.0 inches and the inner diameter is about 2.9 inches.

Because of the number of individual belt elements making up the composite belt 202, welding of the belt in place on a frame would be a complicated procedure. The cantilevered corner conveyor frame of this invention facilitates installation of a preformed loop of composite belt without the need to cut or weld the belt elements of the composite belt 202.

The frame 218 is similar to the frame 28 discussed above. The frame 218 has a cantilevered portion 220, shown in FIG. 6, which is supported above a lower frame 222. The cantilevered portion 220 of the frame 218 supports the infeed roller 214, and the outfeed roller 216. To prevent interference with mounting of the composite belt 202, no vertical structure extends continuously downward from the interior of the path to the support surface on which the frame rests.

In a preferred embodiment, the inner belt 204 is supported on an array of steel rods 224 which extend from the cantilevered portion 220 of the frame 218 as the composite belt 202 progresses through the corner turn.

As shown in FIGS. 6 and 7, the conical infeed roller 214 is mounted to the cantilevered portion of the frame to rotate about a horizontal axis. The outer belt extends from the infeed roller to a first corner pulley 226 which is mounted to a cross member 228 about a vertical axis. The first pulley 226 is mounted at approximately 45 degrees from the infeed roller. The first pulley 226 has a circumferential groove 227 which receives the inwardly extending leg 212 of the outer belt 206. The engagement of the inwardly extending leg 212 within the first pulley circumferential groove 227 serves to retain the composite belt on the corner pulley, and prevent the outer belt from being pulled inwardly off the corner pulley. Slightly downstream of the point of contact between the outer belt and the first pulley 226 is a first idler 230. The first idler 230 is a flat roller which engages against the flat outer periphery of the L-shaped outer belt 206 and retains it in engagement with the first pulley 226.

Due to the tension exerted on the outer belt 206 by the spoke belts 208, there is a tendency for the outer belt to be pulled out of engagement with the first pulley 226. The first idler roller 230 overcomes this tendency. The outer belt 206 runs from the first pulley 226 to a second pulley 232 at approximately 45 degrees downstream from the first pulley and identical in construction. A second idler roller 234 engages against the belt 206 at the second pulley 232. From the second pulley 232 the outer belt 206 runs to the outfeed roller 216 which is a conical roller similar in construction to the inlet roller. Both the infeed roller and the outfeed roller 216 are provided with circumferential inner grooves 236 which engage with the inner belt, and outer grooves 238 which engage with the outer belt 206.

It should be noted that because the composite belt is drivingly engaged by the infeed and outfeed rollers only at the inner belt and the outer belt, alternatively the infeed and the outfeed rollers may each be formed by two pulleys positioned on a common shaft. However, by using a single conical roller a more secure pressfit may be obtained between the roller and the rotatable shaft on which the roller is mounted.

The outer belt 206 continues beneath the outfeed roller where it is looped back towards the infeed roller to a first return roller 240 positioned directly beneath the second pulley 232. The outer belt 206 is engaged with the first return pulley 240 by a first return idler 242 which engages the belt 206 just ahead of the first return pulley. From the first return pulley 240 the belt 202 extends to a second return pulley 244 and a second idler 246 and from thence to the infeed roller 214.

There is a tendency for the inner belt 204 to be pulled tight between the infeed roller and the outfeed roller, however, the spoke belts exert a tension force on the inner diameter belt and distend it towards the outer radius belt. The compound belt may be supported along its inner diameter travel on the steel rods 224.

Figure 9:
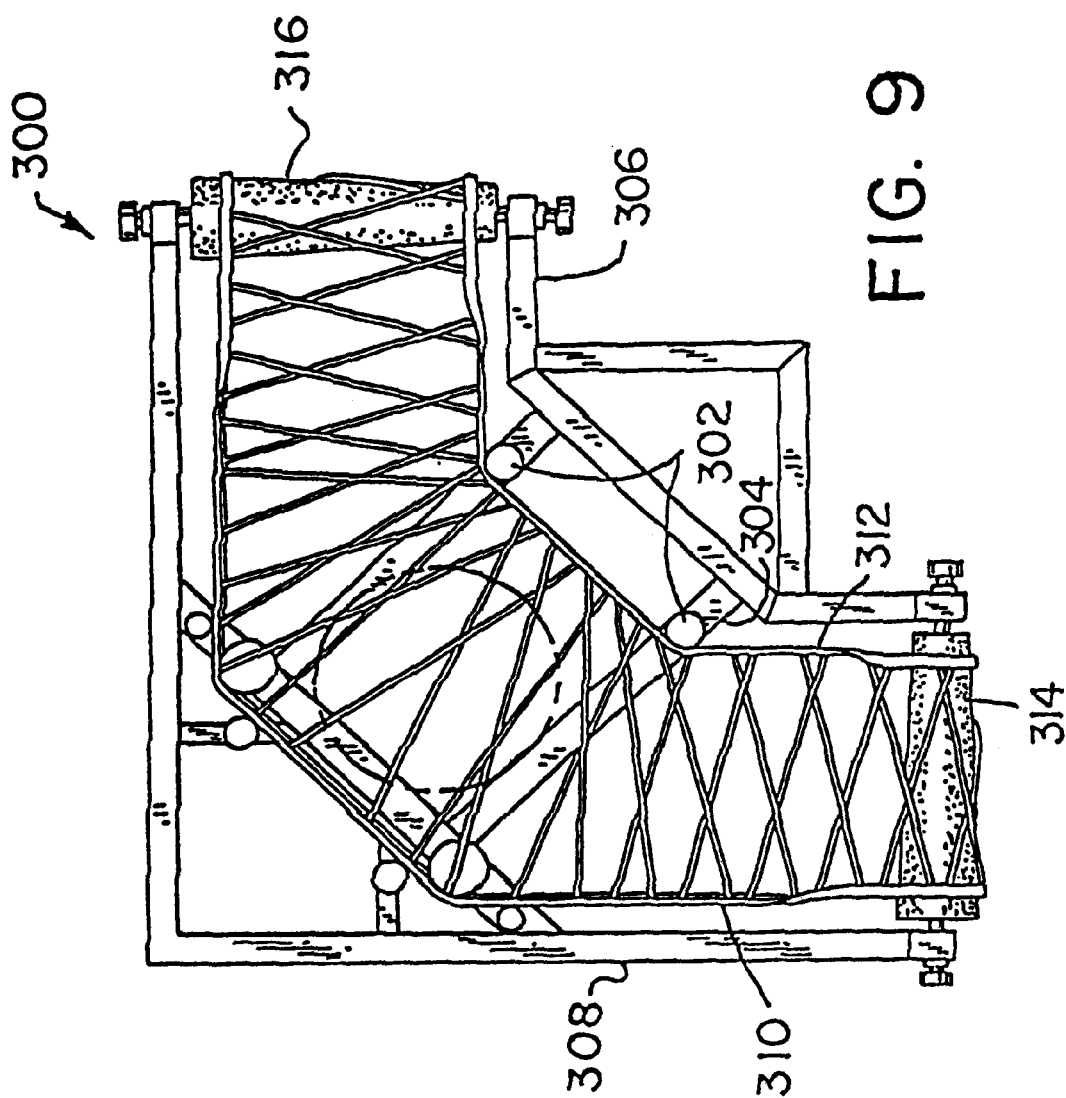
FIG. 9 is a top plan view of an alternative embodiment web belt conveyor corner turn of this invention.

An alternative embodiment web belt conveyor corner turn 300 is shown in FIG. 9. For applications where cleanability is of key concern, the corner turn 300 eliminates the supporting rods for the inner belt, and has two inside guide pulleys 302 which guide the web belt on the inside diameter of the web's path. The inside guide pulleys 302 extend upwardly from cross members 304 which are mounted to the cantilevered portion 306 of the frame 308. The composite belt 310 has an inner belt 312 which is also L-shaped, with the short horizontal leg of the L facing toward the inside pulleys 302. The inner belt 312 is thus directed into a more circular path, and restrained from extending in a straight line from the infeed roller 314 to the outfeed roller 316.

Figure 10:
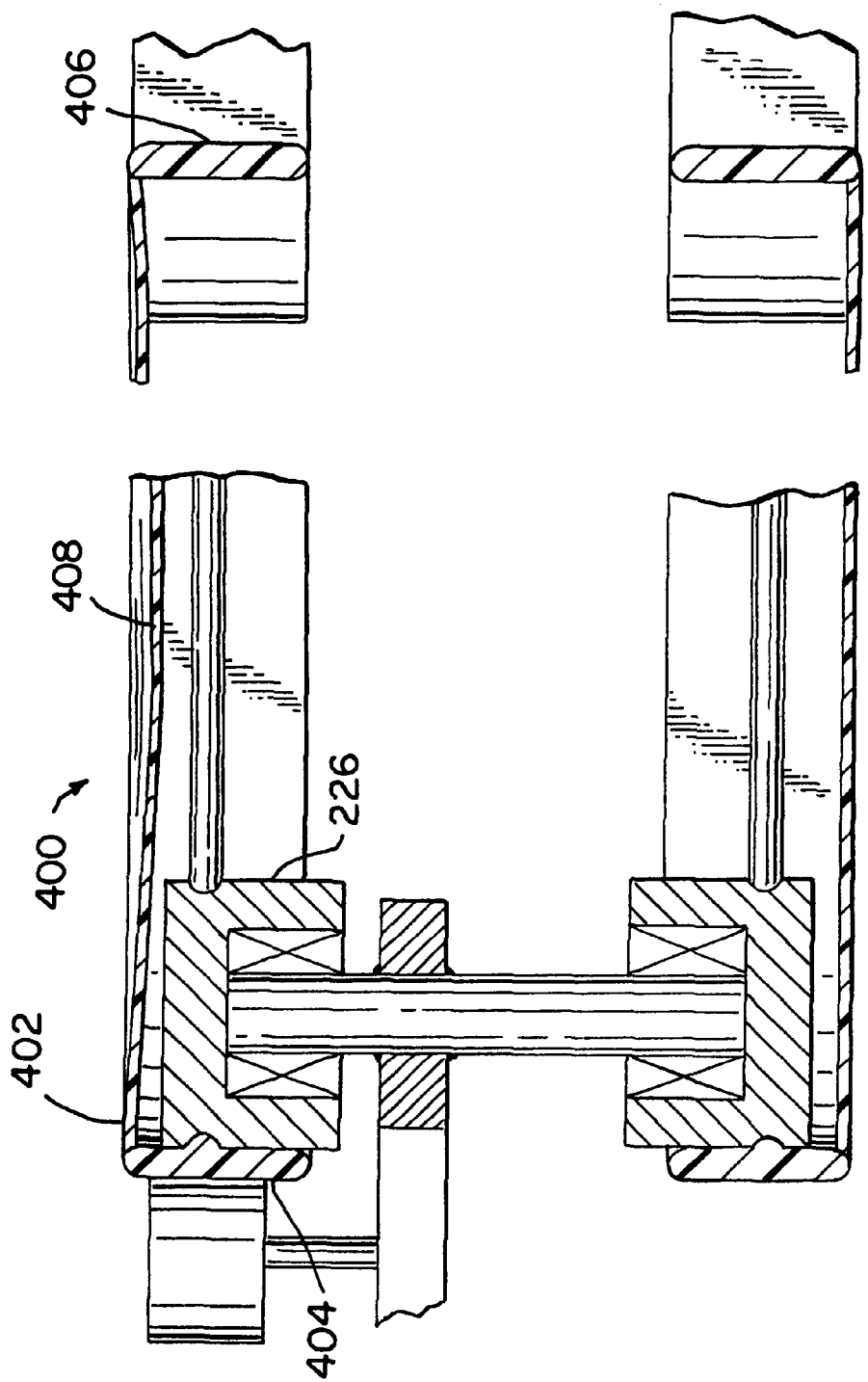
FIG. 10 is a cross-sectional view of an alternative embodiment conveyor corner turn of this invention having a continuous surface elastic belt connected between an inner and an outer belt.

It should be noted that various belt structures may be employed in the conveyor corner turn of this invention. For example, for smaller conveyed articles it may be desirable to employ a conveyor corner turn 400 having a continuous surface belt 402, as shown in FIG. 10. The composite belt 402 is comprised on an outer belt 404 joined to an inner belt 406 by a continuous nonperforate surface elastic belt segment 408. The underlying structure, including the frame and the various pulleys and idlers in such a conveyor corner turn may be identical to those in the conveyor corner turns 200 or 300 disclosed above.

It is understood that the invention is not limited to the particular construction and arrangement of parts herein illustrated and described, but embraces such modified forms thereof as come within the scope of the following claims.

I claim:

1. A conveyor corner turn comprising:

a frame;

an infeed roller mounted to the frame;

an outfeed roller mounted to the frame down stream of the infeed roller;

a first corner pulley mounted to the frame between the infeed roller and the outfeed roller and rotatable about an upwardly extending axis;

a continuous looped web belt which extends between the infeed roller and the outfeed roller, the belt defining an upwardly facing conveyed article path extending downstream from the infeed roller to the outfeed roller, and a downwardly facing belt return path extending from the outfeed roller to the infeed roller, wherein the web belt is comprised of a inner looped belt which extends from the infeed roller to the outfeed roller, an outer looped belt which is spaced radially outwardly from the inner looped belt, the outer looped belt extending from the infeed roller to the outfeed roller and engaged by the first corner pulley, and a plurality of spoke belts, each spoke belt extending criss-cross between and connected to the inner belt and the outer belt and extending over and across the corner pulley axis as the outer belt portion to which it is connected passes by the first corner pulley, the plurality of spoke belts thereby supporting conveyed articles on the web belt as the web belt is moved to convey said articles along the article path.

2. The conveyor corner turn of claim 1 further comprising a return pulley mounted to the frame beneath the first corner pulley, the return pulley engaging the outer belt of the web belt as it traverses the return path.

3. The conveyor corner turn of claim 1 further comprising a second corner pulley mounted to the frame downstream of the first corner pulley, wherein the web belt outer belt is engaged by both the first corner pulley and the second corner pulley.

4. The conveyor corner turn of claim 1 wherein the first corner pulley is positioned radially inwardly of the outer belt, and the periphery of the first corner pulley engages the outer belt.

5. A conveyor corner turn comprising:

a frame:

an infeed roller mounted to the frame;

an outfeed roller mounted to the frame down stream of the infeed roller;

a first corner pulley mounted to the frame between the infeed roller and the outfeed roller;

a continuous looped web belt which extends between the infeed roller and the outfeed roller, the belt defining an upwardly facing conveyed article path extending downstream from the infeed roller to the outfeed roller, and a downwardly facing belt return path extending from the outfeed roller to the infeed roller, wherein the web belt is comprised of a inner looped belt which extends from the infeed roller to the outfeed roller, an outer looped belt which is spaced radially outwardly from the inner looped belt, the outer looped belt extending from the infeed roller to the outfeed roller and engaged by the first corner pulley, and a plurality of spoke belts, each spoke belt extending between and connected to the inner belt and the outer belt, the plurality of spoke belts thereby supporting conveyed articles on the web belt as the web belt is moved to convey said articles along the article path, wherein the first corner pulley is positioned radially inwardly of the outer belt, and the periphery of the first corner pulley engages the outer belt, and wherein the first corner pulley has portions defining a groove which encircles the first corner pulley, and wherein the outer belt has an upwardly extending leg which extends above the groove, and a radially inwardly extending leg which engages with the groove, thereby retaining the outer belt vertically with respect to the first corner pulley.

6. The conveyor corner turn of claim 1 further comprising a first idler roller mounted to the frame radially outwardly of the first corner pulley, wherein the first idler roller engages the outer belt, such that the outer belt is restrained between the first idler roller and the first corner pulley.

7. The conveyor corner turn of claim 6 further comprising:
   a second corner pulley mounted to the frame downstream of the first corner pulley, wherein the web belt outer belt is engaged by both the first corner pulley and the second corner pulley; and
   a second idler roller mounted to the frame radially outwardly of the second corner pulley.

8. A conveyor corner turn comprising:
   a frame;
   an infeed roller mounted to the frame;
   an outfeed roller mounted to the frame down stream of the infeed roller;
   a first corner pulley mounted to the frame between the infeed roller and the outfeed roller;
   a continuous looped web belt which extends between the infeed roller and the outfeed roller, the belt defining an upwardly facing conveyed article path extending downstream from the infeed roller to the outfeed roller, and a downwardly facing belt return path extending from the outfeed roller to the infeed roller, wherein the web belt is comprised of a inner looped belt which extends from the infeed roller to the outfeed roller, an outer looped belt which is spaced radially outwardly from the inner looped belt, the outer looped belt extending from the infeed roller to the outfeed roller and engaged by the first corner pulley, and a plurality of spoke belts, each spoke belt extending between and connected to the inner belt and the outer belt, the plurality of spoke belts thereby supporting conveyed articles on the web belt as the web belt is moved to convey said articles along the article path; and
   a first idler roller mounted to the frame radially outwardly of the first corner pulley, wherein the first idler roller engages the outer belt, such that the outer belt is restrained between the first idler roller and the first corner pulley, wherein the first idler roller rotates about a substantially vertical axis which is positioned downstream of the axis about which the first corner pulley rotates.

9. A conveyor corner turn comprising:
   a frame;
   an infeed roller mounted to the frame;
   an outfeed roller mounted to the frame down stream of the infeed roller;
   a first corner pulley mounted to the frame between the infeed roller and the outfeed roller;
   a continuous looped web belt which extends between the infeed roller and the outfeed roller, the belt defining an upwardly facing conveyed article path extending downstream from the infeed roller to the outfeed roller, and a downwardly facing belt return path extending from the outfeed roller to the infeed roller, wherein the web belt is comprised of a inner looped belt which extends from the infeed roller to the outfeed roller, an outer looped belt which is spaced radially outwardly from the inner looped belt, the outer looped belt extending from the infeed roller to the outfeed roller and engaged by the first corner pulley, and a plurality of spoke belts, each spoke belt extending between and connected to the inner belt and the outer belt, the plurality of spoke belts thereby supporting conveyed articles on the web belt as the web belt is moved to convey said articles along the article path, wherein a first spoke belt is connected to a first point on the outer belt, and a first point on the inner belt which is downstream of the first point on the outer belt, and a second spoke belt extends from a second point on the inner belt which is downstream of the first point on the inner belt, to a second point on the outer belt which is upstream of the first point on the outer belt, such that the first spoke belt crosses over the second spoke belt.

10. The conveyor corner turn of claim 1 further comprising a plurality of rods fixed to the frame between the conveyed article path and the belt return path, such that the web belt passes over the plurality of rods and is supported thereon.

11. The conveyor corner turn of claim 1 further comprising a first inside guide pulley mounted to the frame and engaging the inner belt of the web belt, the first inside guide pulley being positioned radially inwardly from the first corner pulley.

12. The conveyor corner turn of claim 11 wherein the inside guide pulley is positioned radially outwardly of the inner belt.

13. The conveyor corner turn of claim 11 further comprising a second inside guide pulley mounted to the frame downstream of the first inside guide pulley and engaging against the inner belt.

14. The conveyor corner turn of claim 13 wherein the outer belt and the inner belt are inelastic, and wherein the spoke belts are elastic.

15. A conveyor corner turn comprising:
   a frame;
   an infeed roller mounted to the frame and rotating about a substantially horizontal axis;
   an outfeed roller mounted to the frame and rotating about a substantially horizontal axis;
   a first corner pulley mounted to the frame downstream of the infeed roller and rotating about a substantially vertical axis;
   a looped outer belt extending over the infeed roller, around the first corner pulley, and over the outfeed roller and thence back to the infeed roller;
   a looped inner belt extending over the infeed roller, thence over the outfeed roller and back to the infeed roller, the inner belt being spaced radially inwardly from outer belt;

a plurality of belt segments which extend between the inner belt and the outer belt to define an article supporting surface, wherein each belt segment has a first end which is fixed to the outer belt, and a second end which is fixed to the inner belt, wherein each belt segment crosses over at least one other belt segment as it extends between the inner belt and the outer belt, and wherein the inner belt and the outer belt are driven to advance the belt segments around a curved path, to thereby support a conveyed article as it describes a curved path.

16. The conveyor corner turn of claim 15 further comprising a return pulley mounted to the frame beneath the first corner pulley, the return pulley engaging the outer belt.

17. The conveyor corner turn of claim 15 further comprising a second corner pulley mounted to the frame downstream of the first corner pulley, wherein the outer belt is engaged by both the first corner pulley and the second corner pulley.

18. The conveyor corner turn of claim 15 wherein the first corner pulley is positioned radially inwardly of the outer belt, and the periphery of the first corner pulley engages the outer belt.

19. The conveyor corner turn of claim 18 wherein the first corner pulley has portions defining a groove which encircles the first corner pulley, and wherein the outer belt has an upwardly extending leg which extends above the groove, and a radially inwardly extending leg which engages with the groove, thereby retaining the outer belt vertically with respect to the first corner pulley.

20. The conveyor corner turn of claim 15 further comprising a first idler roller mounted to the frame radially outwardly of the first corner pulley, wherein the first idler roller engages the outer belt, such that the outer belt is restrained between the first idler roller and the first corner pulley.

21. The conveyor corner turn of claim 20 further comprising:
   a second corner pulley mounted to the frame downstream of the first corner pulley, wherein the outer belt is engaged by both the first corner pulley and the second corner pulley; and
   a second idler roller mounted to the frame radially outwardly of the second corner pulley.

22. The conveyor corner turn of claim 20 wherein the first idler roller rotates about a substantially vertical axis which is positioned downstream of the axis about which the first corner pulley rotates.

23. The conveyor corner turn of claim 15 further comprising a plurality of rods fixed to the frame beneath the curved path, such that the belt segments pass over the plurality of rods and are supported thereon.

24. The conveyor corner turn of claim 15 further comprising a first inside guide pulley mounted to the frame and engaging the inner belt, the first inside guide pulley being positioned radially inwardly from the first corner pulley.

25. The conveyor corner turn of claim 24 wherein the inside guide pulley is positioned radially outwardly of the inner belt.

26. The conveyor corner turn of claim 24 further comprising a second inside guide pulley mounted to the frame downstream of the first inside guide pulley and engaging against the inner belt.

27. The conveyor corner turn of claim 15 wherein the outer belt and the inner belt are inelastic, and wherein the spoke belts are elastic.

28. A conveyor corner turn comprising:
   a web belt having an inner looped belt connected to an outer looped belt by a plurality of spoke belts, each spoke belt being fixed at one end to the inner belt and at another end fixed to the outer belt; wherein each belt segment crosses over at least one other belt segment as it extends between the inner belt and the outer belt;
   a frame which supports the web belt as the web belt describes a curved path from an inlet to an outlet, the frame having a plurality of rods which extend between the outer web belt and the inner web belt;
   at least one corner pulley rotatably mounted to the frame to extend between the inner belt and the outer belt, wherein the corner pulley engages the outer belt to cause the web belt to describe a curved path, and wherein the inner belt is supported on the plurality of rods as is describes the curved path, unsupported by rollers between the inlet and the outlet.

29. A conveyor corner turn comprising:
   a web belt having an inner looped belt connected to an outer looped belt by a plurality of spoke belts, each spoke belt being fixed at one end to the inner belt and at another end fixed to the outer belt;
   a frame which supports the web belt as the web belt describes a curved path from an inlet to an outlet;
   at least one corner pulley rotatably mounted to the frame to extend between the inner belt and the outer belt, wherein the corner pulley engages the outer belt to cause the web belt to describe a curved path, wherein the outer belt has a first leg which extends generally vertically, and a second leg which extends inwardly from the first leg, and wherein the at least one corner pulley has a groove which receives the second leg therein as the belt is driven along a curved path.

30. The conveyor corner turn of claim 28 wherein the outer belt and the inner belt are inelastic, and wherein the spoke belts are elastic.

31. A conveyor corner turn comprising:
   a frame;
   an infeed roller mounted to the frame and rotating about a substantially horizontal axis;
   an outfeed roller mounted to the frame and rotating about a substantially horizontal axis;
   a first corner pulley mounted to the frame downstream of the infeed roller and rotating about a substantially vertical axis;
   a looped outer belt extending over the infeed roller, around the first corner pulley, and over the outfeed roller and thence back to the infeed roller, the outer belt having portion which extends downwardly to engage the radial exterior of the first corner pulley;
   a looped inner belt extending over the infeed roller, thence over the outfeed roller and back to the infeed roller, the inner belt being spaced radially inwardly from outer belt;
   an article support portion which extends between the inner belt and the outer belt and over and across the corner pulley axis, the article support portion being comprised of an elastic material, and wherein the inner belt and the outer belt are driven to advance the article support portion around a curved path, to thereby support a conveyed article as it describes a curved path.

32. The conveyor corner turn of claim 31 wherein the article support portion is a continuous surface elastic belt segment.

33. A conveyor corner turn comprising:

a frame;

an infeed roller mounted to the frame and rotating about a substantially horizontal axis;

an outfeed roller mounted to the frame and rotating about a substantially horizontal axis;

a first corner pulley mounted to the frame downstream of the infeed roller and rotating about a substantially vertical axis;

a looped outer belt extending over the infeed roller, around the first corner pulley, and over the outfeed roller and thence back to the infeed roller;

a looped inner belt extending over the infeed roller, thence over the outfeed roller and back to the infeed roller, the inner belt being spaced radially inwardly from outer belt;

an article support portion which extends between the inner belt and the outer belt, the article support portion being comprised of an elastic material, and wherein the inner belt and the outer belt are driven to advance the article support portion around a curved path, to thereby support a conveyed article as it describes a curved path, wherein the article support portion is comprised of a plurality of belt segments which extend between the inner belt and the outer belt to define an article supporting surface, wherein each belt segment has a first end which is fixed to the outer belt, and a second end which is fixed to the inner belt, and wherein each belt segment crosses over at least one other belt segment as it extends between the inner belt and the outer belt.

34. A conveyor corner turn comprising:

a frame:

an infeed roller mounted to the frame and rotating about a substantially horizontal axis;

an outfeed roller mounted to the frame and rotating about a substantially horizontal axis;

a first corner pulley mounted to the frame downstream of the infeed roller and rotating about a substantially vertical axis;

a looped outer belt extending over the infeed roller, around the first corner pulley, and over the outfeed roller and thence back to the infeed roller;

a looped inner belt extending over the infeed roller, thence over the outfeed roller and back to the infeed roller, the inner belt being spaced radially inwardly from outer belt;

an article support portion which extends between the inner belt and the outer belt, the article support portion being comprised of an elastic material, and wherein the inner belt and the outer belt are driven to advance the article support portion around a curved path, to thereby support a conveyed article as it describes a curved path, wherein the first corner pulley has portions defining a circumferential groove, and wherein the outer belt has a protruding leg which engages with the circumferential groove as it turns about the first corner pulley.

35. The conveyor corner turn of claim 31 further comprising a return pulley mounted to the frame beneath the first corner pulley, the return pulley engaging the outer belt.

36. The conveyor corner turn of claim 31 further comprising a second corner pulley mounted to the frame downstream of the first corner pulley, wherein the outer belt is engaged by both the first corner pulley and the second corner pulley.

37. The conveyor corner turn of claim 31 further comprising a first idler roller mounted to the frame radially outwardly of the first corner pulley, wherein the first idler roller engages the outer belt, such that the outer belt is restrained between the first idler roller and the first corner pulley.

38. The conveyor corner turn of claim 37 further comprising:

a second corner pulley mounted to the frame downstream of the first corner pulley, wherein the outer belt is engaged by both the first corner pulley and the second corner pulley; and a second idler roller mounted to the frame radially outwardly of the second corner pulley.

39. A conveyor corner turn comprising:

a frame, an infeed roller mounted to the frame and rotating about a substantially horizontal axis;

an outfeed roller mounted to the frame and rotating about a substantially horizontal axis;

a first corner pulley mounted to the frame downstream of the infeed roller and rotating about a substantially vertical axis;

a looped outer belt extending over the infeed roller, around the first corner pulley, and over the outfeed roller and thence back to the infeed roller;

a looped inner belt extending over the infeed roller, thence over the outfeed roller and back to the infeed roller, the inner belt being spaced radially inwardly from outer belt;

an article support portion which extends between the inner belt and the outer belt, the article support portion being comprised of an elastic material, and wherein the inner belt and the outer belt are driven to advance the article support portion around a curved path, to thereby support a conveyed article as it describes a curved path; and a first idler roller mounted to the frame radially outwardly of the first corner pulley, wherein the first idler roller engages the outer belt, such that the outer belt is restrained between the first idler roller and the first corner pulley, wherein the first idler roller rotates about a substantially vertical axis which is positioned downstream of the axis about which the first corner pulley rotates.

* * * * *